United States Patent Office.

JAMES STUART, OF LONDON, ENGLAND.

Letters Patent No. 107,833, dated September 27, 1870; patented in England, August 6, 1869.

IMPROVEMENT IN SEPARATING ANIMAL FROM VEGETABLE FIBERS.

The Schedule referred to in these Letters Patent and making part of the same.

I, JAMES STUART, of London, England, have invented a certain Process for "the Separation of Wool, Hair, Silk, and other Animal Fibers from Vegetable Fibers in materials composed of mixed fibers." of which the following is a specification.

This invention relates to mixed fabrics, or fabrics composed partly of animal and partly of vegetable fibers, and has for its objects, first, the separation of animal fibers, such as, for example, wool, hair, or silk, from the vegetable fibers, such as cotton, flax, jute, or other vegetable fiber; and, secondly, the effecting of this separation in such manner that the animal fiber is obtained uninjured either in substance or quality, and, in a great measure also, in color.

In this way rags, carpet-cuttings, old carpet, and other waste material of mixed fibers, may be utilized to a greater extent than has hitherto been found practicable, and as the separated animal fiber retains, in most cases, its color, it can oftentimes be worked up again into articles for use without the necessity of its being redyed.

The plan hitherto adopted for the purpose of separating such fibers has been to treat the material to be operated upon with acids. This is, however, objectionable, as the animal fiber is, by their action, rotted, and thereby loses its milling and felting properties.

Now, I dispense with these acids, and substitute therefor certain neutral substances.

My invention thus consists in subjecting the rags, carpet-cuttings, old carpet, or other material of animal and vegetable fiber, intermixed, to be operated upon, to the action of chlorides of the metals, or sulphates of the oxides of the metals, preferring, however, to use as my active agent the chloride of aluminum; and in thus treating the material certain chemical reactions take place, whereby the vegetable fiber is decomposed, and the animal fiber is recovered uninjured, either in substance or in color. It is then in a fit state to be remanufactured without recarding, spinning, dyeing, or other operations that have hitherto been necessitated.

In order that the nature of my invention, and the manner in which the same is to be performed, may be particularly described and ascertained, I now proceed to state the manner in which I treat the material to be operated upon, with the substance I prefer to use, namely, the chloride of aluminum.

I first make a solution of ingredients, in or about the following proportions:

In one hundred gallons of hot water I dissolve one hundred pounds of the sulphate of alumina of commerce; I then add fifty pounds of chloride of sodium. When this last-named ingredient is added a reaction takes place; sulphate of soda is formed, and also chloride of aluminum.

With the solution thus made I now saturate or thoroughly wet the material to be treated. It is then placed on hurdles, or in any suitable arrangement for draining, so as to allow the excess of the solution to pass therefrom, or the material may be slightly wrung or pressed for the same purpose.

The material is next dried, by being placed in a drying-room, or by any means convenient for the purpose; and after being dried it is exposed or subjected, either in a drying-room or by some other means, to a steady temperature of 200° Fahrenheit; and during the time of such exposure or treatment the chloride of aluminum decomposes, and the resulting volatile products, as they pass off, act upon the vegetable fiber, rotting or destroying the same, but leave the animal fiber uninjured.

The material treated is then scribbled, and the vegetable matter separates in the form of dust. The vegetable matter may, instead, be separated by washing; but the foregoing is the mode I prefer, and the treatment thus described refers more particularly to rags of light mixed fabrics.

When I treat heavier or denser material, such as carpet-cuttings or old carpet, I make my solution of chloride of aluminum of greater strength, thus, in one hundred gallons of water I dissolve one hundred and fifty pounds in weight of sulphate of alumina and seventy-five pounds of chloride of sodium, and then proceed in the manner hereinbefore described.

In some cases I find it more convenient to treat the material by boiling than by heating in drying-rooms, and I then proceed in the following manner:

I make a solution of sulphate of alumina, by dissolving one hundred pounds of that substance in one hundred gallons of water, and with this solution I saturate the rags, or other material.

They are then drained, and afterward placed in a boiling saturated solution of common salt. In this solution I keep the rags, or other material, boiling until the vegetable fiber is decomposed or rotted. The material is then well washed and dried, and scribbled or carded.

I have given the solution at one hundred pounds of sulphate of alumina to one hundred gallons of water, because I find that to be of a good or useful strength in treating rags. I do not, however, confine myself to those proportions, nor do I confine myself to two hundred degrees of heat, but may vary the heat according to the nature of the material under treatment.

The above description shows clearly the manner in which I prefer to obtain the chloride of aluminum, the agent I prefer to employ for acting on the vegetable fiber; but there are several other ways of obtaining solutions of that chloride, and I propose to carry out my invention for decomposing the vegetable matter by using a solution of chloride of aluminum obtained in any way.

*Claim.*

I claim as my invention—
The process of separating animal from vegetable fibers, by the destruction of the latter by means of a solution of chloride of aluminum, obtained substantially as described.

JAMES STUART.

Witnesses:
M. A. LORD,
 14 *Finsbury Place, London,*
GEO. NEIL,
 4 *Cross Street, London.*